(12) United States Patent
Lee

(10) Patent No.: US 8,142,689 B2
(45) Date of Patent: Mar. 27, 2012

(54) FIRE RETARDANCY AND SHAPE RETENTION REINFORCED POLYESTER

(75) Inventor: Yong Jong Lee, Seoul (KR)

(73) Assignee: Encepkorea Co., Ltd. (KR)

(*) Notice: Subject to any disclaimer, the term of this patent is extended or adjusted under 35 U.S.C. 154(b) by 354 days.

(21) Appl. No.: 12/597,288

(22) PCT Filed: May 1, 2007

(86) PCT No.: PCT/KR2007/002136
§ 371 (c)(1),
(2), (4) Date: Oct. 23, 2009

(87) PCT Pub. No.: WO2008/133365
PCT Pub. Date: Nov. 6, 2008

(65) Prior Publication Data
US 2010/0152335 A1 Jun. 17, 2010

(30) Foreign Application Priority Data
Apr. 26, 2007 (KR) .......................... 10-2007-0040794

(51) Int. Cl.
*C09K 21/00* (2006.01)
*C04B 12/04* (2006.01)
*C04B 28/26* (2006.01)
*C04B 35/16* (2006.01)
*C04B 24/10* (2006.01)
*C04B 24/00* (2006.01)
*C09D 1/02* (2006.01)
*C09J 1/02* (2006.01)

(52) U.S. Cl. ........ 252/609; 106/600; 106/617; 106/618; 106/634

(58) Field of Classification Search .................. 252/609; 106/600, 617, 618, 634
See application file for complete search history.

(56) References Cited

U.S. PATENT DOCUMENTS
3,926,905 A * 12/1975 Nose et al. .................... 524/417
(Continued)

FOREIGN PATENT DOCUMENTS
EP 1 107 267 A1 6/2001
(Continued)

OTHER PUBLICATIONS
International Search Report dated Jan. 21, 2008, issued in corresponding international application No. PCT/KR2007/002136.

*Primary Examiner* — Liam Heincer
(74) *Attorney, Agent, or Firm* — Ostrolenk Faber LLP

(57) ABSTRACT

Disclosed herein is a composition for imparting superior fire retardancy and shape-retaining properties to polyester. The composition comprises 55 to 75% by weight of a sodium silicate solution, 0.5 to 7% by weight of carboxyl methyl cellulose, 0.7 to 10% by weight of a urethane resin, 0.7 to 10% by weight of an acrylic resin mixture and the remaining weight percent of water, based on 100% by weight of the composition, wherein the sodium silicate solution consists of $Na_2O$ and $SiO_2$ in a molar ratio of 1:2.1 to 1:2.9, the urethane resin consists of 70 to 80% by weight of methylene diphenyl isocyanate and 20 to 30% by weight of methylpolyglycol, and the acrylic resin mixture consists of 36 to 40% by weight of a butyl acrylate monomer, 10 to 13% by weight of methyl methacrylate, 1 to 2% by weight of an emulsifier, 3 to 5% by weight of acrylic acid and the remaining weight percent of water.

Disclosed herein are further a method for preparing the composition and a method for applying the composition to a polyester resin. The composition-applied polyester resin is suitable for use as an automobile NVH component, in particular, a sound-absorbing heat-insulation component of an engine room.

7 Claims, 1 Drawing Sheet

U.S. PATENT DOCUMENTS

| | | | |
|---|---|---|---|
| 4,067,815 A * | 1/1978 | Scholl et al. | 252/609 |
| 4,179,535 A * | 12/1979 | Kalbskopf et al. | 427/206 |
| 5,058,342 A * | 10/1991 | Crompton | 52/232 |
| 5,412,003 A * | 5/1995 | Akiyama et al. | 523/513 |
| 5,462,699 A * | 10/1995 | Montgomery | 252/609 |
| 5,478,389 A * | 12/1995 | Loomis | 510/110 |
| 2002/0171068 A1* | 11/2002 | Erismann et al. | 252/606 |
| 2003/0094253 A1* | 5/2003 | Torras et al. | 162/181.1 |
| 2005/0014885 A1* | 1/2005 | Katsuta et al. | 524/501 |
| 2007/0134479 A1* | 6/2007 | Lee et al. | 428/292.1 |
| 2007/0135551 A1* | 6/2007 | Okuda et al. | 524/415 |
| 2011/0213065 A1* | 9/2011 | Giesselbach et al. | 524/417 |

FOREIGN PATENT DOCUMENTS

| | | |
|---|---|---|
| JP | 09-176498 A | 7/1997 |
| KR | 10-98-43158 A | 9/1998 |
| KR | 100232377 B1 | 9/1999 |
| KR | 2006070499 A * | 6/2006 |
| WO | WO 2004081309 A1 * | 9/2004 |

* cited by examiner

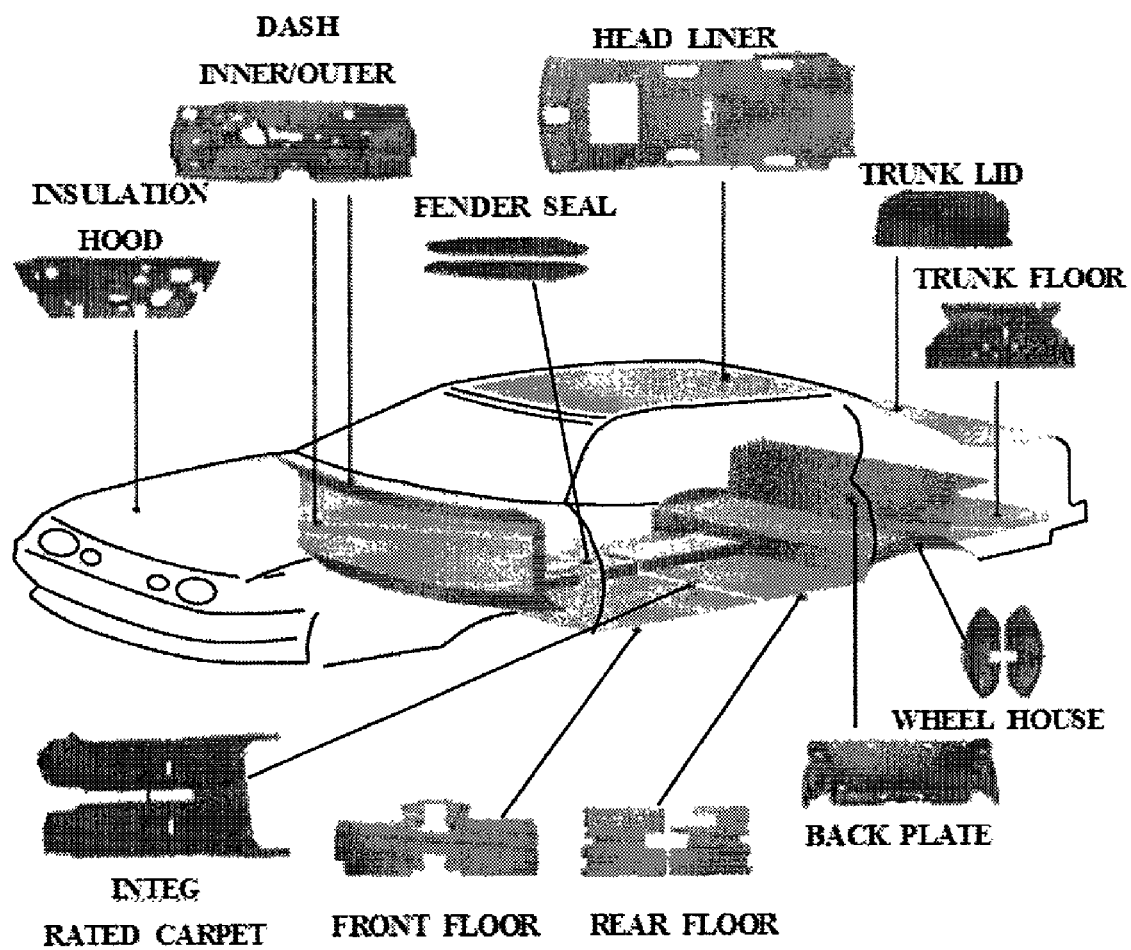

FIRE RETARDANCY AND SHAPE RETENTION REINFORCED POLYESTER

CROSS REFERENCE TO RELATED APPLICATIONS

The present application is a 35 U.S.C. §371 National Phase conversion of PCT/KR2007/002136, filed May 1, 2007, which claims benefit of Korean Application No. 10-2007-0040794, filed Apr. 26, 2007, the disclosure of which is incorporated herein by reference. The PCT International Application was published in the English language.

TECHNICAL FIELD

The present invention relates to a composition for imparting fire retardancy and shape-retaining properties to polyester, a method for applying the composition to a polyester resin, and a polyester resin to which the composition is applied.

BACKGROUND ART

NVH performances determining driving comfort, which is one of feelings experienced by occupants when an automobile is in service, have been the focus of intense interest lately in automobile markets. However, selection of automobile materials is restricted by environmental problems. Accordingly, there is a need to develop materials being free from environmental problems as well as exhibiting improved NVH performances.

The term "NVH" used in the present invention is an acronym composed of the initial letters of three factors, i.e. "Noise", "Vibration" and "Harshness" that affect car occupants' driving comfort. Thus, NVH components cover all automobile components that reduce the level of three factors and thus enable car occupants to feel optimal driving comfort. These three factors are defined as follows:

(1) Noise: an unpleasant sound externally or internally caused by a driving automobile (2) Vibration: a phenomenon in which a driving automobile is vibrated at each cycle (3) Harshness: a vibration or noise caused by impacts on road surfaces while driving on uneven roads NVH components used for vehicles such as automobiles are currently molded by pressing a sound-absorbing heat-insulating material into a mould using a heat- or cold-press. As the material, there may be generally used an EVR sheet, urethane foam, glass wool, resin felt, polyester and the like. In particular, since a high-heat component such as an engine room is required to exhibit fire retardancy to some extent, it is made of glass wool. However, glass wool causes environmental pollutions associated with dust-scattering and waste disposal and is thus limited on its usage.

Polyester is harmless to humans and generates no dust by abrasion, thus being environmentally friendly. In addition, polyester has advantages of excellent heat-insulating property and superior sound-absorbing property. However, polyester has drawbacks of poor fire retardancy and unstability in shape due to high resilience during and after molding.

In this case, it is necessary to use a plasticizer so as to stably retain the shape of final products. Plasticizers currently used to retain the shape have problems in that they contain lead, hexavalent chrome (Cr), diisophthalate (DOP), PVC, a phenol resin, an urea resin, or P.P., all of which are regulated as toxic materials, or emit a toxic gas during ignition.

DISCLOSURE

Technical Problem

It is one object of the present invention to provide a composition for imparting fire retardancy and shape-retaining properties to polyester and a method preparing the composition.

It is another object of the present invention to provide a method for applying the composition to a polyester resin, and a polyester resin, to which the composition is applied, that exhibits improved fire retardancy and shape-retaining properties, while maintaining its inherent properties, i.e. harmlessness to humans, environmental friendliness, and excellent heat-insulating and sound-absorbing properties.

It is yet another object of the present invention to provide to a NVH component made of the polyester resin, the NVH component capable of improving automobile-driving comfort without causing any environmental problem.

Technical Solution

In accordance with an aspect of the present invention for achieving the above object, there is provided a composition capable of imparting superior fire retardancy and shape-retaining properties to polyester. The composition comprises the following constituent components: (i) 55 to 75% by weight of a sodium silicate solution; (ii) 0.5 to 7% by weight of carboxyl methyl cellulose; (iii) 0.7 to 10% by weight of a urethane resin; (iv) 0.7 to 10% by weight of an acrylic resin mixture; and (v) the remaining weight percent of water, based on 100% by weight of the composition, wherein (i) the sodium silicate solution consists of $Na_2O$ and $SiO_2$ in a molar ratio of 1:2.1 to 1:2.9, (iii) the urethane resin consists of 70 to 80% by weight of methylene diphenyl isocyanate and 20 to 30% by weight of methylpolyglycol, and (iv) the acrylic resin mixture consists of 36 to 40% by weight of a butyl acrylate monomer, 10 to 13% by weight of methyl methacrylate, 1 to 2% by weight of an emulsifier, 3 to 5% by weight of acrylic acid and the remaining weight percent of water.

The sodium silicate solution contained in the composition is a constituent component for imparting a superior fire retardancy property to polyester which has been generally used in the art for a long time. The sodium silicate solution induces formation of a silicon carbide film due to a reaction of sodium oxide ($Na_2O$) with silicon dioxide ($SiO_2$) under a high-temperature environment. Upon combustion, the silicon carbide film is expended while generating carbon dioxide and carbon monoxide gases, thus functioning to improve the heat-isolating performance.

$Na_2O$ and $SiO_2$ constituting the sodium silicate solution are preferably used in a molar ratio of 1:2.1 to 1:2.9. The molar ratio means a molar ratio of $SiO_2$ to $Na_2O$ and is calculated by multiplying a weight ratio of $SiO_2/Na_2O$ by a constant of 1.032. The reason for the use of the sodium silicate solution consisting of $Na_2O$ and $SiO_2$ in such a molar ratio is that the composition in the molar ratio is easy to apply to polyester and dehydrate, and has a high drying efficiency, thus improving preparation efficiency, and induces formation of a uniform fire-retardancy film on the surface of synthetic polyester fibers.

The content of the sodium silicate solution affects the weight and fire retardancy of final polyester products. Thus, the sodium silicate solution is preferably used in an amount of 55 to 75% by weight, based on the total weight of the composition. When the content of the sodium silicate solution is lower than 55% by weight, the impartment of the fire retardancy is insufficient. Meanwhile, when the content of the sodium silicate solution exceeds 75% by weight, the viscosity of the composition increases, thus making it difficult to conduct applying and drying processes for realization of fire-retardance and causing a deterioration in preparation efficiency.

The carboxyl methyl cellulose in the composition reduces the viscosity of the sodium silicate solution, thereby allowing the composition to be favorably permeated into fire-retardancy materials, and improves the storage stability of the composition.

The carboxyl methyl cellulose is used in an amount of 0.5 to 7% by weight, based on the total weight of the composition. When the content of the carboxyl methyl cellulose is lower than 0.5% by weight, the viscosity of the composition cannot be decreased to a desired level. Accordingly, the carboxyl methyl cellulose cannot sufficiently exhibit its functions, which renders the composition to be readily applied to a polyester resin, allows the polyester resin to be well dried and enhances storage stability. Meanwhile, when the content of the carboxyl methyl cellulose exceeds 7% by weight, among other components, in particular, the sodium silicate solution has a deteriorated content, and fire retardancy cannot be thus sufficiently realized.

The urethane and acrylic resins of the composition are thermosetting resins, defined as polymeric materials that cannot be reformed into another shape after curing, once they are curing-formed into a permanent shape under heat. These thermosetting resins inhibit the thermoplasticity of the polyester resin, thereby enabling the retainment of the shape.

The urethane resin that can be used in the present invention is a mixture of 70 to 80% by weight of an isocyanate-based compound (e.g. toluene diisocyanate (TDI) or methylene diphenyl isocyanate (MDI)) and 20 to 30% by weight of methylpolyglycol. As the isocyanate-based compound, preferred is the use of low-toxic methylene diphenyl isocyanate.

The acrylic resin mixture consists of 36 to 40% by weight of a butyl acrylate monomer, 10 to 13% by weight of methyl methacrylate, 1 to 2% by weight of an emulsifier, 3 to 5% by weight of acrylic acid and the remaining weight percent of water.

The urethane resin and the acrylic resin mixture are used in an amount of 0.7 to 10% by weight, based on the total weight of the composition. When the content of each component is lower than 0.7% by weight, the shape-retaining property cannot be sufficiently imparted to the polyester resin, and the strength of the molded polyester resin is low. Meanwhile, when the content of each component exceeds 10% by weight, the weight of the material is increased and the sound-absorbing property is deteriorated.

In addition to the components, the composition comprises the remaining weight percent of water, based on 100% by weight of the composition.

The present invention is directed to a method for preparing the composition. The method comprises: (a) mixing a sodium silicate solution with a urethane resin; (b) mixing an acrylic resin mixture with water; (c) slowly adding the mixture obtained in step (b) to the mixture obtained in step (a) with stirring; and (d) adding carboxyl methyl cellulose to the reaction mixture obtained in step (c).

When the sodium silicate solution is directly mixed with water, partial coagulation occurs, thus making it impossible to form a uniform mixture. For this reason, the urethane resin and the acrylic resin mixture are used as mediums. Mores specifically, by adding a mixture of an acrylic resin mixture and water to a mixture of a sodium silicate solution and a urethane resin with slowly stirring, a uniform reaction mixture can be prepared and a final composition can exhibit superior storage stability.

In addition, the present invention is directed to a method for applying the composition to a polyester resin. It is preferable to use impregnation so that the composition can be completely applied to the overall polyester resin. The impregnation is performed through impregnation, dehydration and drying processes. The impregnation process is carried out using a high-pressure nozzle. The dehydration process is carried out by roller-pressing, vacuum suction and vibration. The drying process is carried out by high-temperature curing and low-temperature drying.

When the polyester resin, into which the composition is impregnated, is subjected to heating, the viscosity and specific gravity of the composition are decreased. As a result, the composition settles on the bottom. Thus, in an initial drying step, a hot-air pressure (3 to 7 kg/cm$^2$) at a high temperature of 160° C. or higher is introduced into the polyester resin, thereby quick-curing the polyester resin while preventing the composition from settling on the bottom. During the high-temperature curing, the polyester resin is dried to a drying ratio of about 70%, dehydrated at a low temperature of 110 to 130° C., and subjected to cooling for maintenance of the shape.

In addition, the present invention is directed to a polyester resin to which the composition is applied. The shape of the polyester resin, to which the composition is applied, is not particularly limited, but it is preferable to use a laminated polyester resin having a double-density structure. Such a polyester resin enables strong adhesion owing to double-density and renders the shape of molded products to be more stably maintained.

The double-density laminated polyester resin may be prepared by forming fibers into a web shape, laminating the fibers, and needle-punching the laminate such that the fibers are weaved with one another. Another fiber formed into a web shape is thermal-bonded onto the weave fiber, to form the fibers into a sheet-shape. To ensure the thickness of the sheet to a desired level, semi-punching, allowing the web-shape fibers to be weaved with one another on only the upper surface thereof may be used.

The density range of the two layers constituting the double-density polyester board may be favorably controlled according to its usage. For example, it is possible to use a double-density polyester board in which high-density ($\geqq 70$ kg/m$^3$) polyester is bonded to low density ($\geqq 10$ kg/m$^3$) polyester, such that the total average density of the board is adjusted to 15 to 50 kg/m$^3$, based on the density of the polyester resin, to which the resin composition is applied.

The composition-applied polyester resin can be used as a material for automobile NVH components. As shown in FIG. 1, examples of the NVH components include, but are not limited to an insulation hood, an inner/outer dash, a fender seal, a head liner, a truck lid, a truck floor, a wheel house, a back plate, a rear floor, a front floor and an integrated carpet. The composition-applied polyester resin is suitable for use as a sound-absorbing insulation material for an engine room which requires heat-resistance and heat-insulation.

Advantageous Effects

The composition of the present invention is capable of imparting superior fire retardancy and shape-retaining properties to polyester. The polyester, to which the composition is applied, exhibits improved fire retardancy and shape-retaining properties, while maintaining its inherent properties, i.e.

harmlessness to human body, environmental friendliness, and excellent heat-insulating and sound-absorbing properties. Accordingly, the polyester of the present invention can be used to manufacture a NVH component capable of improving automobile-driving comfort without causing any environmental problem.

DESCRIPTION OF DRAWINGS

The above and other objects, features and other advantages of the present invention will be more clearly understood from the following detailed description taken in conjunction with the accompanying drawing, in which:

FIG. 1 shows examples of automobile NVH components that may be composed of a polyester resin, to which the composition of the present invention is applied.

BEST MODE

The present invention will be better understood from the following examples. These examples are not to be construed as limiting the scope of the invention.

EXAMPLES

Example 1

(1) Preparation of Composition

A sodium silicate solution was prepared by mixing a sodium silicate liquid No. 2 and a sodium silicate liquid No. 3, both of which are commercially available, such that the molar ratio (i.e. $SiO_2/Na_2O$ weight ratio×1.032) was adjusted to 2.5. The sodium silicate liquid No. 2 used herein consists of 52 to 54 wt % of Be' at 20° C., 14 to 15 wt % of $Na_2O$, 34 to 35 wt % of $SiO_2$, 0.05 wt % or less of $Fe_2O_3$, and 0.2 wt % or less of a water-insoluble solid. The sodium silicate liquid No. 3 used herein consists of 40 to 42 wt % Be' at 20° C., 9 to 10 wt % of $Na_2O$, 28 to 30 wt % of $SiO_2$, 0.03 wt % or less of $Fe_2O_3$, and 0.2 wt % or less of a water-insoluble solid.

To the sodium silicate solution, there was added: 5% by weight of carboxyl methyl cellulose; 5% by weight of a urethane resin consisting of 70% by weight of methylene diphenyl isocyanate (MDI) and 30% by weight of methylpolyglycol, based on 100% by weight of the urethane resin; 5% by weight of an acrylic resin mixture consisting of 36% by weight of a butyl acrylate monomer, 10% by weight of methyl methacrylate, 1% by weight of an emulsifier, 3% by weight of acrylic acid and the remaining weight percent of water, based on the weight of the acrylic resin mixture; and the remaining weight percent of water, based on 100% by weight, to prepare a composition for imparting fire retardancy and shape-retaining property to polyester.

(2) Production of Polyester Board and Application of (1) Composition to Polyester Board A low-density (15.5 kg/m$^3$) polyester layer and a high-density (47 kg/m$^3$) polyester layer were bonded to each other. The laminate was impregnated into the composition prepared in section (1), followed by drying, to produce a double-density polyester board (total thickness: 30 nm; total average density: 37 kg/m$^3$) including a low-density (32.5 kg/m$^3$) polyester layer with a thickness of 27 nm and a high-density (74 kg/m$^3$) polyester layer with a thickness of 3 nm.

(3) Test of Fire-Retardancy

KS F 2271 Test

The polyester board produced in section (2) was tested for fire-retardancy, according to a KS F 2271 test method for testing the fire-retardancy of a construction of a building and an interior material, in Fire Insurers Laboratories of Korea. The results are shown in Table 1 below. It can be confirmed from data shown in Table 1 that the polyester board produced in section (2) exhibited fire retardancy higher than the second Grade based on criterions according to the KS F 2271 test.

TABLE 1

| | Item/Test No. | | 1 | 2 | 3 | Standard | Estimation |
|---|---|---|---|---|---|---|---|
| Surface test | Fire-retardancy area (temperature (° C.) × time (min)) | Within 3 min | 0 | 0 | 0 | 0 | Second Grade for fire-retardancy (semi-incombustible material) |
| | | After 3 min | 0 | 0 | 0 | ≦100 | |
| | Smoking coefficient (CA) | | 3.0 | 4.0 | 4.0 | ≦60 | |
| | Residual flame time (sec) | | 0 | 0 | 0 | <30 | |
| | Melting (relative to total thickness) | | none | none | none | none | |
| | Crack width of backside | | 0 | 0 | 0 | ≦(Thickness × 1/10) | |
| | Undesirable deformation related to ignition | | none | none | none | none | |
| Additional test | Fire-retardancy area (temperature (° C.) × time (min)) | | 0 | 0 | 0 | ≦150 | |
| | Smoking coefficient (CA) | | 3.0 | 3.0 | 3.0 | ≦60 | |
| | Residual flame time (sec) | | 0 | 0 | 0 | ≦90 | |
| Test for gas toxicity | Time for stopping (min:sec) | | 14:38 | 14:55 | | 9 min or more | |

UL 94 V-0 Test

The material tested is UL 94 V-0 classified if it satisfies the following standards: i) when a burner flame was applied to samples for 10 seconds and was then removed, the burning time (the time until the sample flame applied is extinguished) does not exceed 10 seconds; ii) when the test for a set of five samples is repeated ten times, the total burning time does not exceed 50 seconds; iii) no burning drops should fall which may cause the cotton underneath (i.e. at a distance of about 30 cm from any test sample) to ignite. Provided that at least one of the five samples does not satisfy one of the requirements, the same test should be repeated with other five samples. In this case, the total ignition time should be within 51 to 55 seconds.

The polyester board produced in section (2) was tested as mentioned above. As a result, it can be confirmed that the polyester board meets the UL 94 V-0 standards.

Example 2

The polyester board produced in section (2) was dried and was pressed onto a nonwaven fabric and an aluminum (Al) foil using a heat-press equipped with a mold at 160 to 220° C. for 15 to 45 seconds.

The polyester resin, to which the composition of the present invention is applied, exhibits improved fire-retardancy. It can be confirmed that a NVH components made of the polyester resin shows excellent shape-retaining property.

Comparison in properties between glass wool generally used as a material for NVH components and the polyester resin of the present invention is briefly shown in Table 2.

TABLE 2

| Item | Polyester of the present invention | glass wool |
|---|---|---|
| Harmfulness to environment/ human body | Hygienic due to non-occurrence of scattering dust | Unhygienic due to occurrence of scattering dust |
| Weatherability | Shape-retained by vibrational impacts | Shape-reformed by vibrational impacts |
| Economical efficiency | High production efficiency due to short heat-pressing time (i.e. 15 sec) Low scrap-disposal cost Unnecessary for prevention of dust-scattering | Low production efficiency due to long heat-pressing time (i.e. 40 sec) high scrap-disposal cost Necessary for prevention of dust-scattering |
| Recycling | Possibilities of recycling and incineration No environmental problems caused by waste disposal | Impossibility in recycling and difficulty in incineration Environmental problems caused by waste disposal |
| Easy handling | Non-toxicity and non-smell upon heat-press Unnecessary for prevention instrument | Toxicity upon heat-press Necessary for prevention instrument |

What is claimed is:

1. A composition for imparting superior fire retardancy and shape-retaining properties to polyester, the composition comprising:
   (i) 55 to 75% by weight of a sodium silicate solution;
   (ii) 0.5 to 7% by weight of carboxyl methyl cellulose;
   (iii) 0.7 to 10% by weight of a urethane resin;
   (iv) 0.7 to 10% by weight of an acrylic resin mixture; and
   (v) the remaining weight percent of water, based on 100% by weight of the composition,
   wherein the sodium silicate solution consists of $Na_2O$ and $SiO_2$ in a molar ratio of 1:2.1 to 1:2.9, the urethane resin consists of 70 to 80% by weight of methylene diphenyl isocyanate and 20 to 30% by weight of methylpolyglycol, and the acrylic resin mixture consists of 36 to 40% by weight of a butyl acrylate monomer, 10 to 13% by weight of methyl methacrylate, 1 to 2% by weight of an emulsifier, 3 to 5% by weight of acrylic acid and the remaining weight percent of water.

2. A method for preparing the composition according to claim 1, the method comprising:
   (a) mixing a sodium silicate solution with a urethane resin;
   (b) mixing an acrylic resin mixture with water;
   (c) slowly adding the mixture obtained in step (b) to the mixture obtained in step (a) with stirring; and
   (d) adding carboxyl methyl cellulose to the reaction mixture obtained in step (c).

3. A method for treating a polyester resin to impart fire retardancy and shape-retaining properties to the polyester resin, the method comprising impregnating the polyester resin into the composition according to claim 1, followed by dehydrating and drying.

4. The method according to claim 3, wherein the impregnation is carried out using a high-pressure nozzle, the dehydration is carried out by roller-pressing, vacuum suction and vibration, and the drying is carried out by high-temperature curing and low-temperature drying.

5. The method according to claim 3, wherein the polyester resin has a shape of a double-density polyester board.

6. A polyester resin treated by the method according to claim 3, the polyester resin with fire retardancy and shape-retaining properties.

7. A NVH component for an automobile manufactured by press-molding the polyester resin according to claim 6.

* * * * *